United States Patent
Chen et al.

(10) Patent No.: US 7,899,773 B2
(45) Date of Patent: Mar. 1, 2011

(54) EVENT DETECTION AND METHOD AND SYSTEM

(75) Inventors: Kuan-Yu Chen, Taipei County (TW);
Pin-Chuan Chen, Taichung (TW);
Chih-Hao Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 732 days.

(21) Appl. No.: 12/005,355

(22) Filed: Dec. 27, 2007

(65) Prior Publication Data

US 2009/0125471 A1     May 14, 2009

(30) Foreign Application Priority Data

Nov. 8, 2007     (TW) .............................. 96142216 A

(51) Int. Cl.
*G06F 17/00* (2006.01)
(52) U.S. Cl. ........................................... 706/48; 700/30
(58) Field of Classification Search ................... 706/45, 706/14, 48; 703/11; 714/25, 26; 700/29, 700/30, 31
See application file for complete search history.

(56) References Cited

U.S. PATENT DOCUMENTS

| | | | | |
|---|---|---|---|---|
| 7,668,579 | B2 * | 2/2010 | Lynn ........................... | 600/323 |
| 2003/0065409 | A1 * | 4/2003 | Raeth et al. ................... | 700/31 |
| 2004/0143398 | A1 * | 7/2004 | Nelson ......................... | 702/14 |
| 2006/0293777 | A1 * | 12/2006 | Breitgand et al. ........... | 700/108 |
| 2007/0191688 | A1 * | 8/2007 | Lynn ........................... | 600/300 |
| 2009/0030336 | A1 * | 1/2009 | Woo et al. .................... | 600/547 |
| 2009/0138252 | A1 * | 5/2009 | Tsai et al. ..................... | 703/11 |
| 2010/0290346 | A1 * | 11/2010 | Barford et al. .............. | 370/242 |

OTHER PUBLICATIONS

Chen.KY et al. Hot Topic Extraction Based on Timeline Analysis and Multidimensional Sentence Modeling. IEEE Transactions on Knowledge and Data Engineering, vol. 19, No. 8, Aug. 2007.*
Chen.CC et al. An Aging Theory for Event Life-Cycle Modeling. IEEE Transactions on Systems, Man, and Cybernetics—Part A: Systems and Humans, vol. 37, No. 2, Mar. 2007.*
Chen.CC et al. Life Cycle Modeling of News Events Using Aging Theory. European Conference on Machine Learning 2003, LNAI 2837, pp. 47-59, 2003.*
Valery Guralnik and Jaideep Srivastava. 1999. Event detection from time series data. In Proceedings of the fifth ACM SIGKDD international conference on knowledge discovery and data mining (KDD '99). ACM, New York, USA, 33-42.*

* cited by examiner

*Primary Examiner*—Donald Sparks
*Assistant Examiner*—David H Kim
(74) *Attorney, Agent, or Firm*—Birch, Stewart, Kolasch & Birch, LLP

(57) ABSTRACT

An event detection method is disclosed. At least one most adaptable life cycle model is generated according to at least one historical event data, at least one nutrition growing function, and at least one firing point rule. Event data is received and a strength value thereof is calculated according to a life cycle model corresponding to the event data. It is determined whether an event firing point is achieved according to the strength value variation. If the event firing point is achieved, an event corresponding to the event data is sent. The event detection method enhances the ability of event tracking and development so event firing is more accurate to fit real event occurring situations, realize event evolution, and filter false alarms.

23 Claims, 6 Drawing Sheets

EVENT DETECTION AND METHOD AND SYSTEM

BACKGROUND OF THE INVENTION

1. Field of the Invention

The invention relates to an event detection method, and more particularly to an event detection method and system based on event strength progression.

2. Description of the Related Art

Event detection technology has been widely applied to various systems, comprising enterprise security, driving monitor, training activity, and the like. Conventional event detection algorithm determines event occurrence and adopts suitable operations based on feature changes after the event has occurred. When feature change for events is detected, corresponding operations may be adopted.

Conventional event detection methods directly detect original values of event factors and a rule-based method determines whether an event is generated, which generates events with a simple and intuitional manner, such that potential conditions for generated events may be ignored.

Thus, an event detection method and system based on event strength progression is desirable, enhancing the ability of event tracking and development, so that event firing is more accurate to match real event occurring situations, realize event evolution, and filter false alarms

BRIEF SUMMARY OF THE INVENTION

Event detection methods are provided. An exemplary embodiment of an event detection method comprises the following. Historical event data is retrieved from a historical event database according to an event factor. A nutrition growing function is selected from a nutrition growing function library according to the historical event data. At least one event firing point rule is selected from a firing point rule database according to the historical event data. The historical event data and the nutrition growing function are applied to a life cycle model to calculate strength value variation of the historical event data. The strength value variation of the historical event data is compared with a historical event session retrieved from the historical event database based on the historical event data to determine whether the strength value variation of the historical event data corresponds to a historical event variation according to the event firing point rule. If the strength value variation corresponds to the historical event variation, the life cycle model is served as a most adaptable life cycle model. Event data corresponding to the event factor is received and strength value variation of the event data is rendered based on the most adaptable life cycle model. It is determined whether a predefined event firing point is achieved according to the strength value variation of the event data. If the event firing point is achieved, an event corresponding to the event data is delivered.

Event detection systems are provided. An exemplary embodiment of an event detection system comprises a historical event database, a firing point rule database, a nutrition growing function library, a firing event module, a life cycle training module, and an event strength tracking module. The historical event database stores plural pieces of historical event data. The firing point rule database stores plural event firing point rules. The nutrition growing function library stores plural nutrition growing function. The life cycle training module retrieves historical event data from a historical event database according to an event factor, selects a nutrition growing function from the nutrition growing function library according to the historical event data, selects at least one event firing point rule from the firing point rule database according to the historical event data, applies the historical event data and the nutrition growing function to a life cycle model to calculate strength value variation of the historical event data, compares the strength value variation of the historical event data with a historical event session retrieved from the historical event database based on the historical event data to determine whether the strength value variation of the historical event data corresponds to a historical event variation according to the event firing point rule, and, if the strength value variation corresponds to the historical event variation, serves the life cycle model as a most adaptable life cycle model. The event strength tracking module receives event data corresponding to the event factor from a data receiver and renders strength value variation of the event data based on the most adaptable life cycle model, determines whether a predefined event firing point is achieved according to the strength value variation of the event data, and, if the event firing point is achieved, delivers an event corresponding to the event data.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
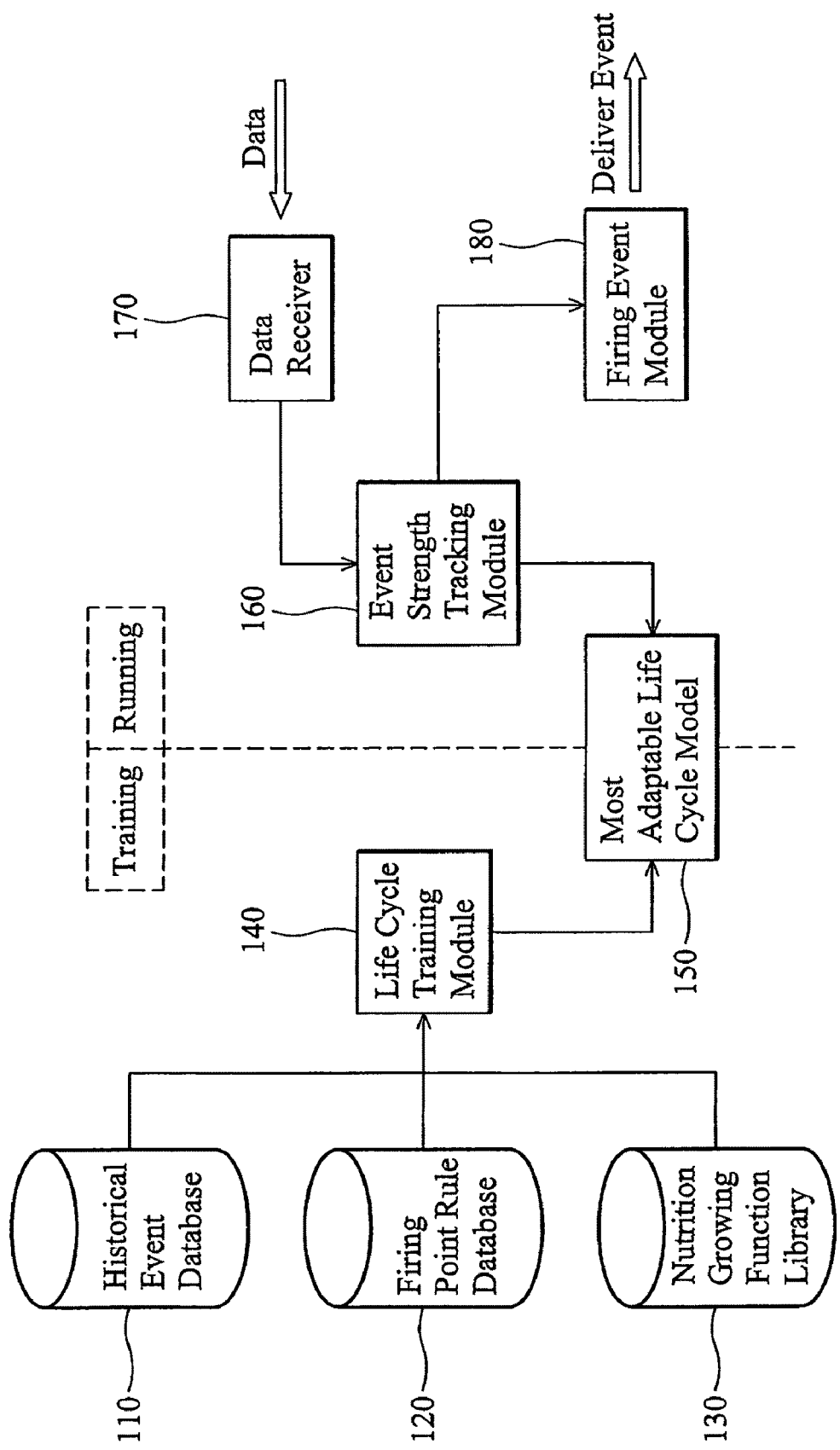
FIG. 1 is a schematic view of an event detection system of the present invention.

Several exemplary embodiments of the invention are described with reference to FIGS. 1 through 4, which generally relate to event detection. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses an event detection method and system based on event strength progression.

An embodiment of the event detection method and system based on event strength progression is illustrated by, but is not limited to, medical treatment care, water quality check, air quality monitor, and the like are also involved.

FIG. 1 is a schematic view of an event detection system of the present invention.

The event detection system at least comprises a historical event database 110, a firing point rule database 120, a nutrition growing function library 130, a life cycle training module 140, a most adaptable life cycle model 150, an event strength tracking module 160, a data receiver 170, and a firing event module 180.

The historical event database 110 stores historical data of each occurred events for training and comparing training results to determine exclusive life cycle models of each event factor. The firing point rule database 120 stores various firing point rules for determining whether rules for real events are triggered based on strength value variations to decide whether notifications are delivered to the data receiver 170. The nutrition growing function library 130 stores various nutrition growing functions. A nutrition growing function is used for calculating raw data of an event and a nutrition value corresponding to the event at a time point to calculate the latest strength value variation of the event according to the nutrition value. Different function contents are generated based on different events. The life cycle training module 140 generates a most adaptable life cycle model for each event according to training data retrieved from the historical event database 110, the firing point rule database 120, and the nutrition growing function library 130.

The most adaptable life cycle model 150 is the result of the life cycle training module 140, comprising firing point rules and nutrition growing functions for resulting events. The event strength tracking module 160 receives event data from the data receiver 170 and renders strength value variation of the event data based on the most adaptable life cycle model corresponding the event data. When the latest strength value variation achieves an event firing point, a notification is sent to the firing event module 180. The data receiver 170 receives source data corresponding to an event factor and transforms the event data to a data format required for rendering the strength value variation of the event data. The firing event module 180 transforms a type of the event data to a notification format according to the strength value variation and thereby delivers the event.

Figure 2:
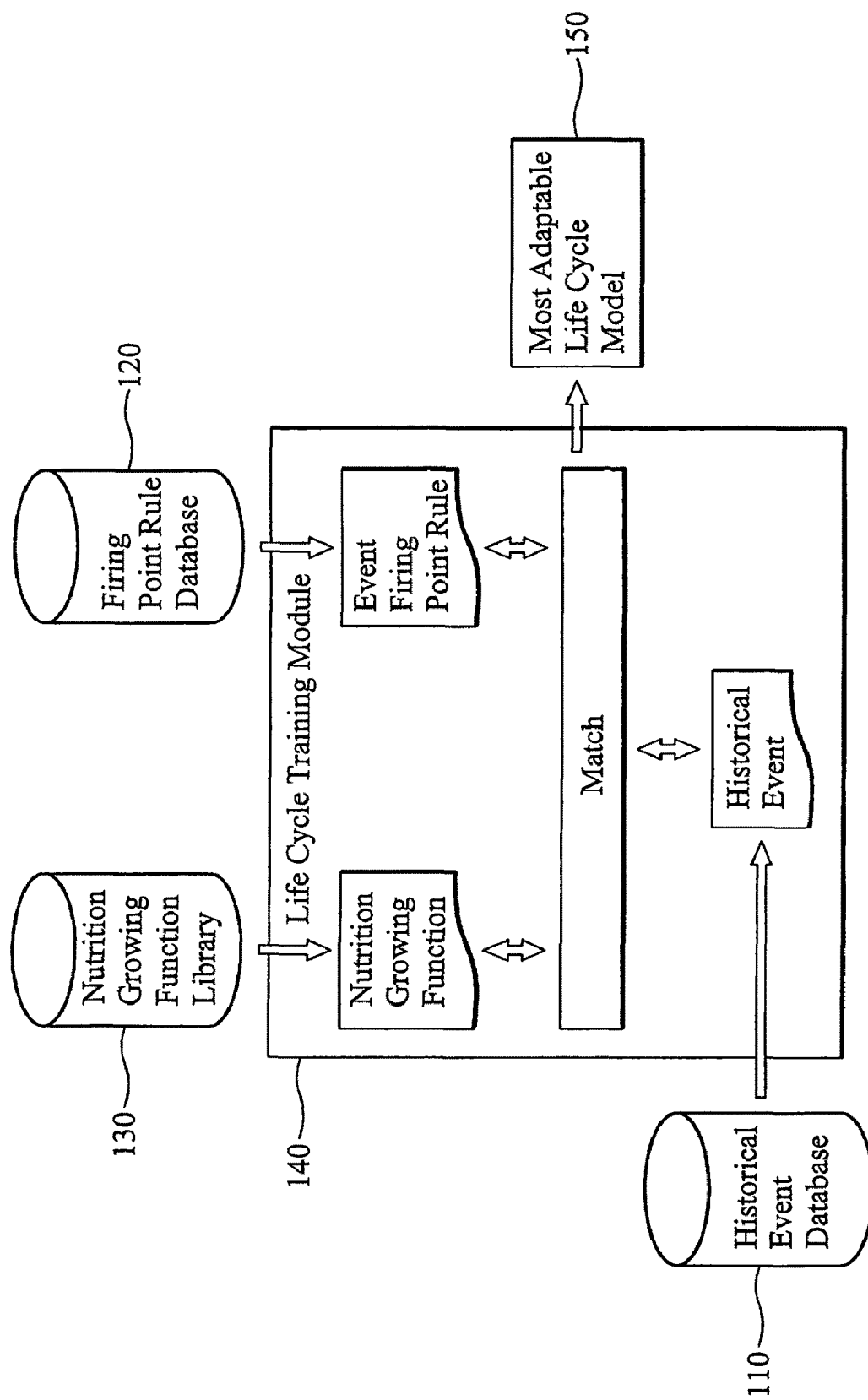
FIG. 2 is a schematic view of generating a most adaptable life cycle model of the present invention.

Referring to FIGS. 1 and 2, during the training phase, the life cycle training module 140 retrieves historical event data among various time sessions from the historical event database 110, retrieves various firing point rules (such as slope, variation, threshold, average, and the like) from the firing point rule database 120, and retrieves various nutrition growing functions (such as regression, difference, dependency to time, similarity comparison, and the like) from the nutrition growing function library 130. The life cycle training module 140 compares the historical event data with an occurred event and generates a most adaptable life cycle model based on selected nutrition growing functions and firing point rules.

Figure 3A:
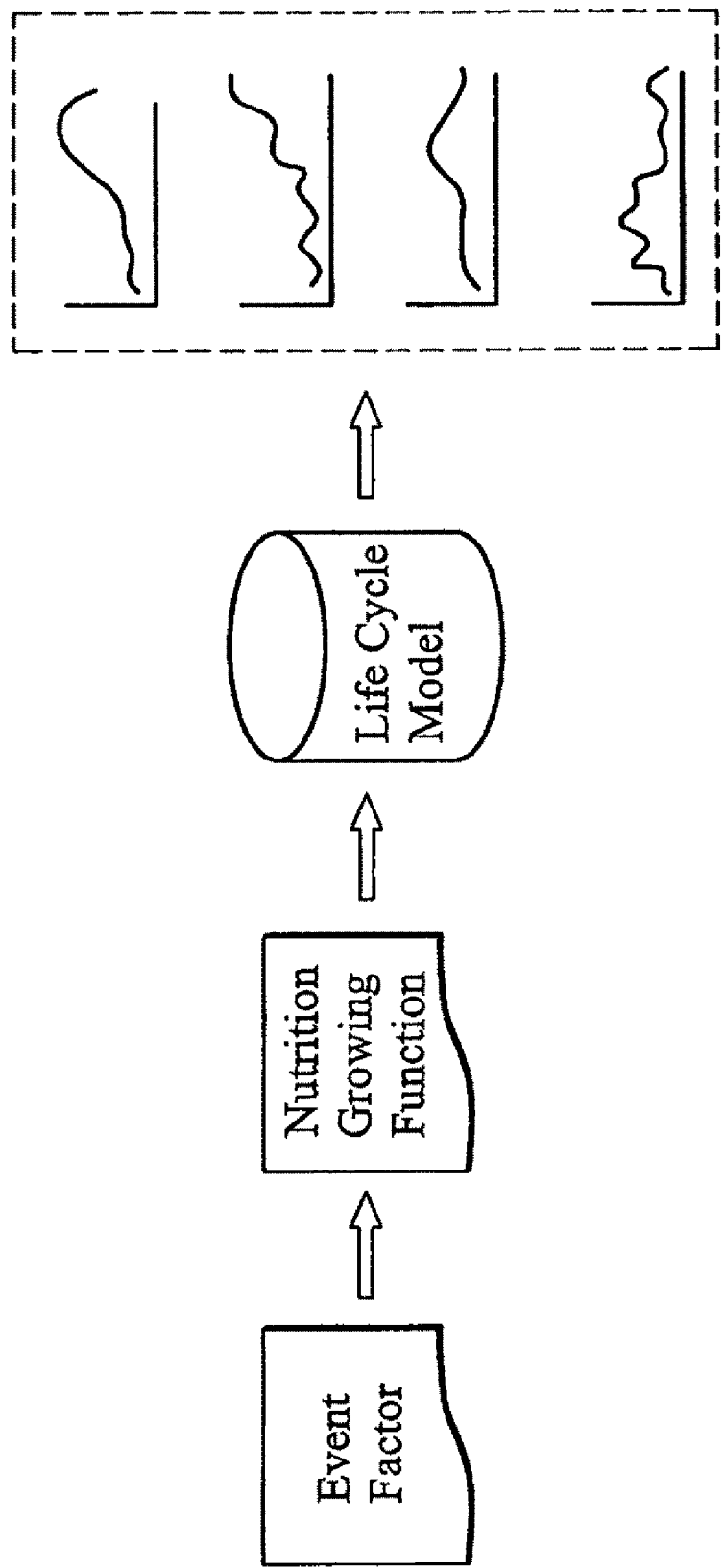
FIGS. 3A, 3B, 3C and 3D are workflows of generating the most adaptable life cycle model shown in FIG. 2.

With respect to generation of the most adaptable life cycle model, referring to FIG. 3A, an event factor (comprising $SPO_2$, diastolic pressure, pulse, breath frequency, temperature, pulse pressure, and so forth) is first selected. Various nutrition growing functions are selected from the nutrition growing function library 130 and applied to various life cycle models to render strength value variations of event data. The nutrition growing functions are selected by "training" and applicable nutrition growing functions are located by matching trigger points.

Nutrition growing functions can be pre-selected based on event factor characteristics so event data training and comparison can be faster. Event factors are selected based on factor characteristics, described in the following. With respect to normal domain, some event factors provide upper and lower boundaries where an event with an event strength value over the upper or lower boundary is considered as abnormal. For a normal domain providing a lower boundary, an event with an event strength value thereof over the lower boundary is considered as abnormal. Some event factors are essential body detection. Minor and abnormal blood pressure, for example, are very important to the human body. Thus, a higher sensitive index is assigned to a critical event factor. High and low adjustment of the sensitive index may be performed to emphasize importance of an event factor.

Figure 3B:
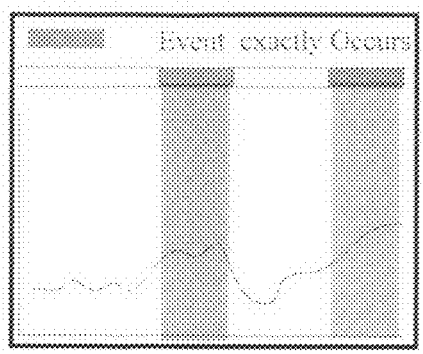
Figure 3C:
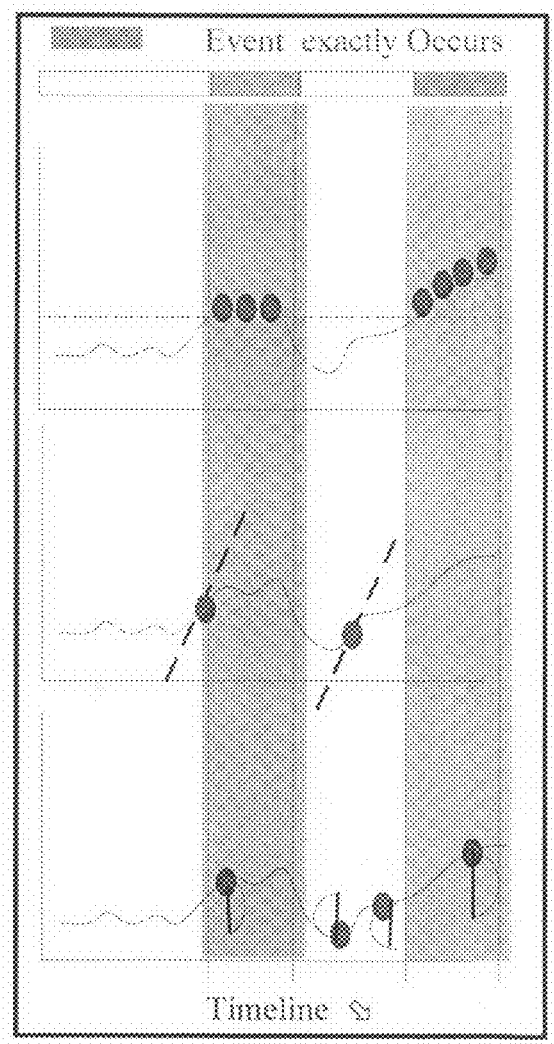

When the strength value variation of the event data is obtained, it overlaps time sessions at which the event data was historically generated, finding actual strength value variation while the event data is being generated, as shown in FIG. 3B. A selected firing point rule is applied to match event points, when the event data is triggered, with historical occurring time of the event data, as shown in FIG. 3C. The upper section represents event matching while applying a threshold value rule, the middle represents event matching while applying a slope rule, and the lower section represents event matching while applying a variation degree rule. The points on the charts represent trigger occasions resulted by applying the firing point rules.

Figure 3D:
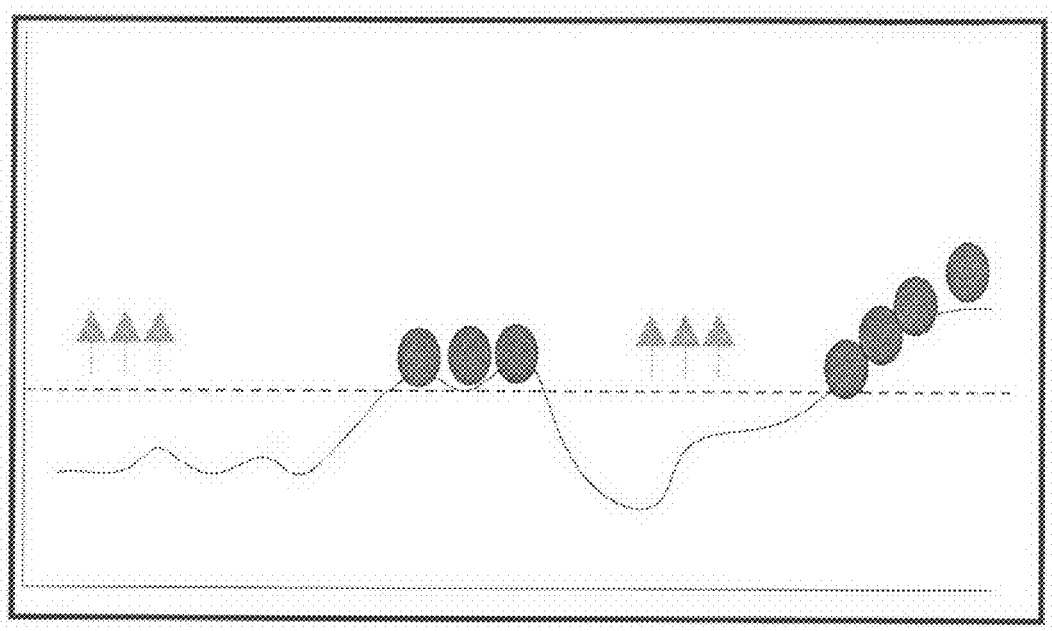

When a threshold value rule is applied, an event notification is triggered when the strength value variation of the event data exceeds a predefined threshold value. When a slope rule is applied, an event notification is triggered when substantial change for a slope generated by the strength value variation of the event data is detected. When a variation degree rule is applied, an event notification is triggered when substantial variation for the strength value variation of the event data is detected. Referring to FIG. 3C, the result when applying the threshold value rule corresponds to the most historical situations that the trigger points fall into in historical sessions, as shown in FIG. 3D. Thus, a life cycle model applying the threshold value rule is served as the most adaptable life cycle model 150.

If time dimension is added to the firing point rule, determination may be precise. The determination of the firing point rule is further described in the following.

If the threshold value rule is applied, it is determined whether strength value of event data maintains over a predefined threshold value within a period of time, and, if not, an instant alarm may be triggered, and, if so, an alarm is triggered when the strength value of event data maintains over the predefined threshold value. Applying the variation degree rule represents that strength value variation of the event data for a past time (long or short time) is recalled from the strength value variation at a time point to calculate a variation value on the present. Applying the slope value represents variations of rising or falling tendency for the strength value variation at a time point (long or short time). The time length indicates more or less attention to the event data. An event factor with a high sensitive index is assigned slope determination with a shorter time session. Additionally, tendency variation (upward or downward variation) is detected based on variations of the strength value of the event data along the time axis.

Alarm trigger points for the strength value variations are found using the described processes and are compared with historical event data. The points found using the described processes act as a numerator while time points overlapping the historical sessions of the event data generated act as a denominator, and the result is represented by a percentage. The higher percentage indicates that the applied firing point is more accurate.

During the running phase, the data receiver 170 repeatedly detects and receives event data, transforms the event data to a data format required for rendering the strength value variation of the event data, and delivers the event data to the event strength tracking module 160. The event strength tracking module 160 receives the event data from the data receiver 170 and renders the strength value variation of the event data based on a corresponding life cycle model. When the latest strength value variation achieves the firing point rule, an event delivery notification is sent to the firing event module 180. When the event delivery notification is received, the firing event module 180 transforms a type of the event data to a notification format according to the strength value variation and thereby delivers an event.

Figure 4:
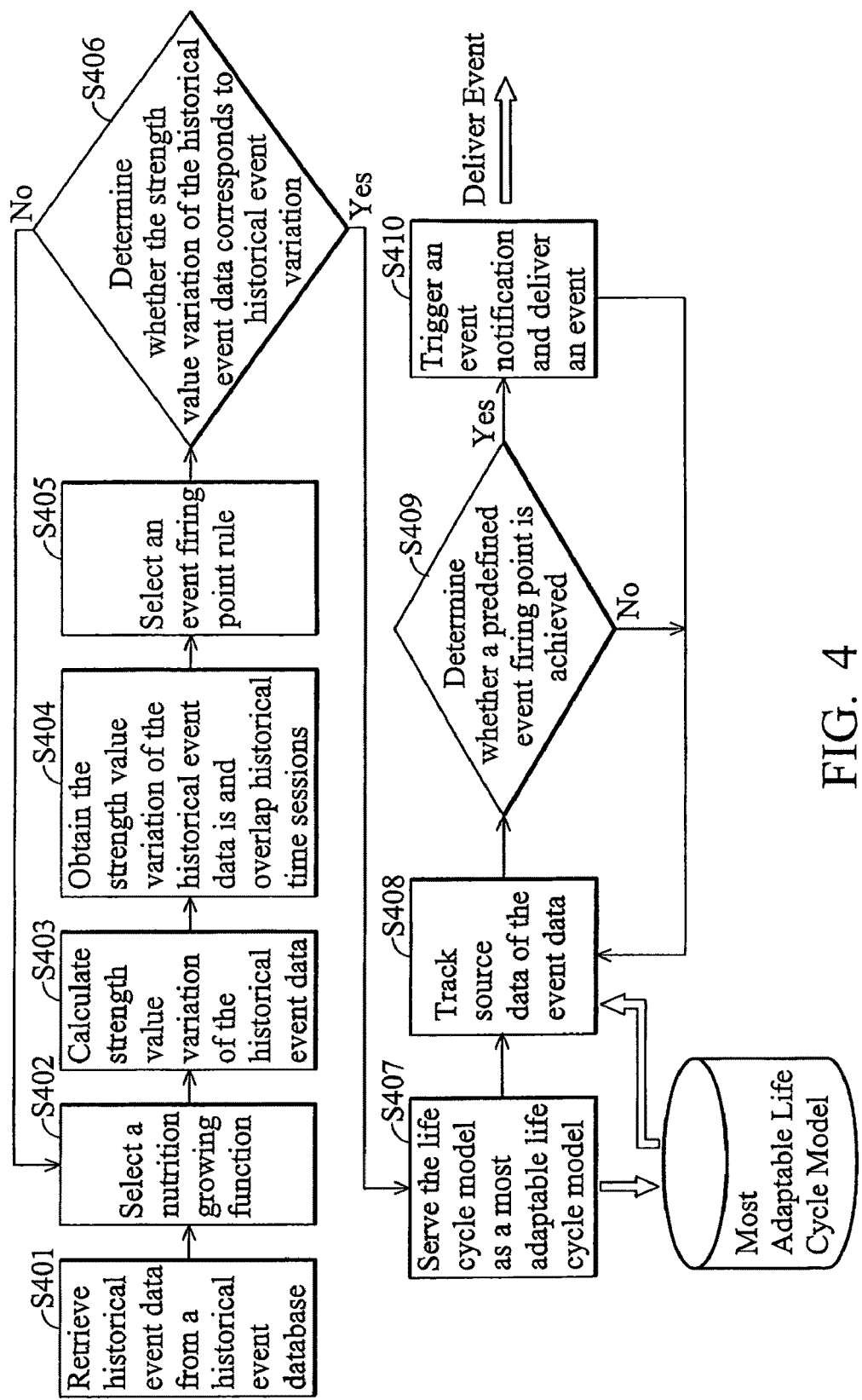
FIG. 4 is a flowchart of an event detection method of the present invention.

FIG. 4 is a flowchart of an event detection method of the present invention.

Historical event data is retrieved from a historical event database according to an event factor (step S401). A nutrition growing function is selected from a nutrition growing function library according to the historical event data (step S402). The historical event data and the nutrition growing function are applied to a life cycle model to calculate strength value variation of the historical event data (step S403). The strength value variation of the historical event data is obtained and overlaps time sessions at which the event data is historically generated, finding actual strength value variation while the event data is being generated (step S404). An event firing point rule is selected from a firing point rule database according to the historical event data (step S405). It is determined whether the strength value variation of the historical event data corresponds to a historical event variation according to the selected event firing point rule (step S406).

If the strength value variation does not correspond to the historical event variation, another nutrition growing function and event firing point rule are selected and the process proceeds to step S402 to repeat matching life cycle models. If the strength value variation corresponds to the historical event variation, the life cycle model is served as a most adaptable life cycle model (step S407). Source data of the event data is tracked and the event data is received and the strength value variation of the event data is rendered based on the most adaptable life cycle model (step S408). It is determined whether a predefined event firing point is achieved according to the strength value variation of the event data (step S409). If the event firing point is achieved, an event corresponding to the event data is delivered (step S410). Or the event data is continuously tracked.

An embodiment of the event detection method and system based on event strength progression transforms event data to event strength values according to characteristics of historical event data, analyzes variations of the strength value variations along the time axis, and determines whether an event can be triggered to be a real event, resulting in notifications and alarms.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An event detection method, comprising:

retrieving historical event data from a historical event database according to an event factor;

selecting a nutrition growing function from a nutrition growing function library according to the historical event data;

selecting at least one event firing point rule from a firing point rule database according to the historical event data;

applying the historical event data and the nutrition growing function to a life cycle model to calculate strength value variation of the historical event data;

using a computer to compare the strength value variation of the historical event data with a historical event session retrieved from the historical event database based on the historical event data to determine whether the strength value variation of the historical event data corresponds to a historical event variation according to the event firing point rule;

if the strength value variation corresponds to the historical event variation, serving the life cycle model as a most adaptable life cycle model;

receiving event data corresponding to the event factor and rendering strength value variation of the event data based on the most adaptable life cycle model;

determining whether a predefined event firing point is achieved according to the strength value variation of the event data; and if the event firing point is achieved, delivering an event corresponding to the event data.

2. The event detection method as claimed in claim 1, wherein another nutrition growing function and event firing point rule are selected, if the strength value variation does not correspond to the historical event variation, to repeat the applying, comparing, and serving steps.

3. The event detection method as claimed in claim 1, wherein plural nutrition growing functions are selected, from the nutrition growing function library, and applied to plural life cycle models to render strength value variations corresponding to each life cycle model.

4. The event detection method as claimed in claim 1, wherein the event firing point rule represents a threshold value rule that an event notification is triggered when the strength value variation of the event data exceeds a predefined threshold value.

5. The event detection method as claimed in claim 1, wherein the event firing point rule represents a slope rule that an event notification is triggered when substantial change for a slope generated by the strength value variation of the event data is detected.

6. The event detection method as claimed in claim 1, wherein the event firing point rule represents a variation degree rule that an event notification is triggered when substantial variation for the strength value variation of the event data is detected.

7. An event detection system, comprising:
- a computer processor;
- a historical event database, storing plural pieces of historical event data;
- a firing point rule database, storing plural event firing point rules;
- a nutrition growing function library, storing plural nutrition growing functions; a firing event module;
- a life cycle training module, retrieving historical event data from a historical event database according to an event factor, selecting a nutrition growing function from the nutrition growing function library according to the historical event data, selecting at least one event firing point rule from the firing point rule database according to the historical event data, applying the historical event data and the nutrition growing function to a life cycle model to calculate strength value variation of the historical event data, comparing the strength value variation of the historical event data with a historical event session retrieved from the historical event database based on the historical event data to determine whether the strength value variation of the historical event data corresponds to a historical event variation according to the event firing point rule, and, if the strength value variation corresponds to the historical event variation, serving the life cycle model as a most adaptable life cycle model; and
- an event strength tracking module, receiving event data corresponding to the event factor from a data receiver and rendering strength value variation of the event data based on the most adaptable life cycle model, determining whether a predefined event firing point is achieved according to the strength value variation of the event data, and, if the event firing point is achieved, delivering an event corresponding to the event data.

8. The event detection system as claimed in claim 7, wherein the life cycle training module selects another nutrition growing function and event firing point rule, if the strength value variation does not correspond to the historical event variation, to repeat the applying, comparing, and serving steps.

9. The event detection system as claimed in claim 7, wherein the life cycle training module selects, from the nutrition growing function library, and applies plural nutrition growing functions to plural life cycle models to render strength value variations corresponding to each life cycle model.

10. The event detection system as claimed in claim 7, wherein the event firing point rule represents a threshold value rule that an event notification is triggered when the strength value variation of the event data exceeds a predefined threshold value.

11. The event detection system as claimed in claim 7, wherein the event firing point rule represents a slope rule that an event notification is triggered when substantial change for a slope generated by the strength value variation of the event data is detected.

12. The event detection system as claimed in claim 7, wherein the event firing point rule represents a variation degree rule that an event notification is triggered when substantial variation for the strength value variation of the event data is detected.

13. The event detection system as claimed in claim 7, wherein the life cycle training module applies the historical event data in the historical event database for training and comparing training results to determine an exclusive life cycle model of the event factor.

14. The event detection system as claimed in claim 7, wherein the life cycle training module applies the nutrition growing functions in the nutrition growing function library for calculating the event data and a nutrition value corresponding to the event data at a time point to calculate the latest strength value variation of the event data according to the nutrition value.

15. The event detection system as claimed in claim 14, wherein the life cycle training module applies different nutrition growing functions based on different historical event data.

16. The event detection system as claimed in claim 7, wherein the data receiver receives event data corresponding to the event factor and transforms the event data to a data format required for rendering the strength value variation of the event data.

17. The event detection system as claimed in claim 7, wherein the firing event module transforms a type of the event data to a notification format according to the strength value variation and thereby delivers the event.

18. A non-transitory computer-readable storage medium storing a computer program providing an event detection method, comprising using a computer to perform the steps of:
- retrieving historical event data from a historical event database according to an event factor;
- selecting a nutrition growing function from a nutrition growing function library according to the historical event data;
- selecting at least one event firing point rule from a firing point rule database according to the historical event data;
- applying the historical event data and the nutrition growing function to a life cycle model to calculate strength value variation of the historical event data;
- comparing the strength value variation of the historical event data with a historical event session retrieved from the historical event database based on the historical event data to determine whether the strength value variation of the historical event data corresponds to a historical event variation according to the event firing point rule;
- if the strength value variation corresponds to the historical event variation, serving the life cycle model as a most adaptable life cycle model;
- receiving event data corresponding to the event factor and rendering strength value variation of the event data based on the most adaptable life cycle model;
- determining whether a predefined event firing point is achieved according to the strength value variation of the event data; and
- if the event firing point is achieved, delivering an event corresponding to the event data.

19. The computer-readable storage medium as claimed in claim 18, wherein another nutrition growing function and event firing point rule are selected, if the strength value variation does not correspond to the historical event variation, to repeat the applying, comparing, and serving steps.

20. The computer-readable storage medium as claimed in claim 18, wherein plural nutrition growing functions are selected, from the nutrition growing function library, and applied to plural life cycle models to render strength value variations corresponding to each life cycle model.

21. The computer-readable storage medium as claimed in claim 18, wherein the event firing point rule represents a threshold value rule that an event notification is triggered when the strength value variation of the event data exceeds a predefined threshold value.

22. The computer-readable storage medium as claimed in claim 18, wherein the event firing point rule represents a slope rule that an event notification is triggered when substantial change for a slope generated by the strength value variation of the event data is detected.

23. The computer-readable storage medium as claimed in claim 18, wherein the event firing point rule represents a variation degree rule that an event notification is triggered when substantial variation for the strength value variation of the event data is detected.

* * * * *